United States Patent
Van Wageningen

(10) Patent No.: US 12,068,782 B2
(45) Date of Patent: Aug. 20, 2024

(54) COMBINED CENTRAL AND DISTRIBUTED MULTILEVEL INTERFERENCE HANDLING FOR AN OPTICAL WIRELESS COMMUNICATION SYSTEM

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 86 days.

(21) Appl. No.: 17/926,156

(22) PCT Filed: May 20, 2021

(86) PCT No.: PCT/EP2021/063401
§ 371 (c)(1),
(2) Date: Nov. 18, 2022

(87) PCT Pub. No.: WO2021/234064
PCT Pub. Date: Nov. 25, 2021

(65) Prior Publication Data
US 2023/0198618 A1    Jun. 22, 2023

(30) Foreign Application Priority Data

May 22, 2020 (EP) .................................. 20175971

(51) Int. Cl.
*H04B 10/114* (2013.01)

(52) U.S. Cl.
CPC .................................. *H04B 10/114* (2013.01)

(58) Field of Classification Search
None
See application file for complete search history.

(56) References Cited

U.S. PATENT DOCUMENTS

| 2011/0105134 | A1 | 5/2011 | Kim et al. | |
| 2014/0086039 | A1* | 3/2014 | Mantri | H04B 15/00 370/201 |

FOREIGN PATENT DOCUMENTS

| EP | 3422772 A1 * | 1/2019 | ....... H04B 10/07953 |
| EP | 3422772 A1 | 1/2019 | |
| WO | 2018001481 A1 | 1/2018 | |

* cited by examiner

*Primary Examiner* — David W Lambert

(57) ABSTRACT

This invention relates to an interference handling method and system for an optical wireless communication system, wherein multiple levels and operating modes are provided to flexibly handle partitioning of a coordination functionality between a central entity and distributed entities. Thereby, the coordination functionality which relies on interference reports from devices in overlapping coverage areas of access points can be central or distributed over access points or partly central and partly distributed.

13 Claims, 7 Drawing Sheets

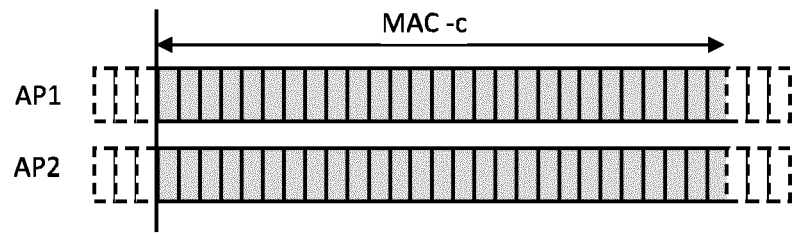
Fig. 3
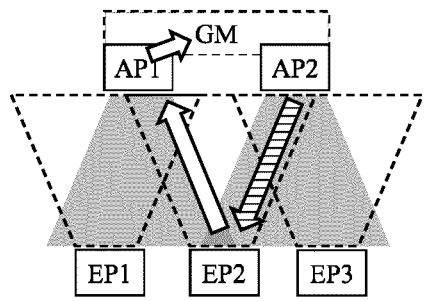 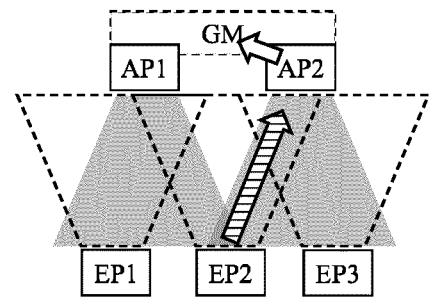
Fig. 4A          Fig. 4B
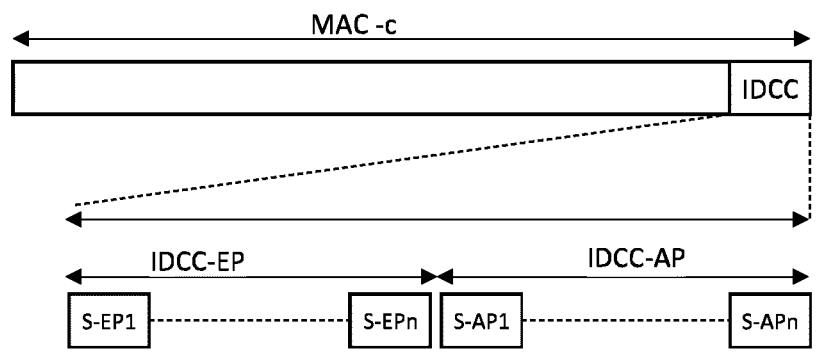
Fig. 5

COMBINED CENTRAL AND DISTRIBUTED MULTILEVEL INTERFERENCE HANDLING FOR AN OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2021/063401, filed on May 20, 2021, which claims the benefit of European Patent Application No. 20175971.9, filed on May 22, 2020. These applications are hereby incorporated by reference herein.

FIELD OF THE INVENTION

The invention relates to the field of communication in optical wireless networks, such as—but not limited to—Li-Fi networks, for use in various different applications for home, office, retail, hospitality and industry.

BACKGROUND OF THE INVENTION

US2014/0086039 A1 discloses a system and method for coordination of neighboring networks on Wireline communication channels that comprises: determining, by a first domain master of a first network domain, a first number of network nodes of the first network domain that interfere with data transmission on the physical medium by at least one network node of at least one other network domain. The method further comprises causing, by the first domain master, one or more network nodes of the first network domain to transmit data during one of a plurality of non-overlapping time slots of a MAC cycle. When a domain master requires more time than alloted, the domain master may negotiate to lease time from a neighboring domain master.

Optical wireless networks, such as Li-Fi networks (named like Wi-Fi networks), enable mobile user devices (called end points (EP) in the following) like laptops, tablets, smartphones or the like to connect wirelessly to the internet. Wi-Fi achieves this using radio frequencies, but Li-Fi achieves this using the visible and non-visible light spectrum (including ultraviolet (UV) and infrared (IR) light) which can enable unprecedented data transfer speed and bandwidth. Furthermore, it can be used in areas susceptible to electromagnetic interference.

Based on the modulations, the information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

A communication signal can be embedded in a light signal emitted by an illumination source of an access device, such as an everyday luminaire, e.g. room lighting or outdoor lighting, thus allowing use of the illumination from the luminaires as a carrier of information. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

As already mentioned above, such communication signals may also utilize light signals outside the visible spectrum. Outside the visible spectrum in particular the IR or UV range are interesting candidates as these are not visible and thus do not cause visible artefacts; which may be particularly relevant for transmissions originating from handheld devices.

In the following, the term "access point" (AP) is used to designate a logical access device that can be connected to one or more physical access devices (e.g. transceivers). Such physical access devices may typically be located at a luminaire and the logical access point may be connected to one or more physical access devices each located at one or more luminaires. However, compared to RF technology, the range of each access point is smaller, allowing a higher density of access devices.

European patent application EP3422772 A1 discloses a beacon enabled visible light communication system that comprises a global coordinator and a number of coordinators each coordinating a visible light personal area network, each visible light personal area network in turn may serve multiple visible light communication devices. The patent application aims to address interference from overlapping VPANs during beacon transmission. Which problem, in the absence of interference coordination amongst two or more VPANs interfering with each other, results in a device in an interference area of these VPANS being unable to correctly detect beacons when it attempts to access a network.

Where coverage areas of neighboring APs overlap, interference of communications between APs and EPs can occur. However, in such dense networks, interference handling can become complex if the overlapping areas of the access points are not well organized. Coordination of the APs is therefore needed to handle such interference.

A global master function (GM) that manages the LiFi network can provide such coordination. The GM can be a central unit but may also be distributed over multiple units.

While the centralized approach has the advantage that the GM has all information available for aiming at optimized interference handling, the distributed approach provides the advantage of being independent of a central control unit.

However, if the central unit (GM) fails, interference handling will fail for all APs. Furthermore, if many changes occur in a centrally managed system with many APs and many moving EPs, the central unit may be overloaded or the communication overhead between the APs and the GM may become too large. Moreover, APs may rely on a centralized or distributed approach, depending on their implementation. If such different implementations of APs are applied within a single optical wireless network, the central unit may not work properly.

On the other hand, an algorithm for assigning interference-free time slots in a distributed system may not converge, may take considerable time and/or may be suboptimal.

SUMMARY OF THE INVENTION

It is an object of the present invention to provide a more flexible approach for interference handling in optical wireless networks.

This object is achieved by an apparatus as claimed in claim 1, by an access point as claimed in claim 5, by a network controller as claimed in claim 6, by an optical wireless communication system as claimed in claim 11, by a method as claimed in claim 13, and by a computer program product as claimed in claim 15.

According to a first aspect, an apparatus for coordinating interference handling in an optical wireless communication network is provided, wherein the apparatus is configured to negotiate a configuration of interference handling functions between a central interference handling entity and a distributed interference handling entity and to set an interference handling operation mode based on the negotiated configuration, wherein the interference handling operation mode determines a distribution of the interference handling functions between the central interference handling entity and the distributed interference handling entity.

According to a second aspect, a method of coordinating interference handling in an optical wireless communication network is provided, wherein the method comprises:
- negotiating a configuration of interference handling functions between a central interference handling entity and a distributed interference handling entity; and
- setting an interference handling operation mode based on the negotiated configuration;
- wherein the interference handling operation mode determines a distribution of the interference handling functions between the central interference handling entity and the distributed interference handling entity.

Throughout the present disclosure, the term "negotiation" is intended to be understood as any information exchange (e.g. by handshaking, request/acknowledgement, etc.) between two or more participating entities (e.g. the central and distributed interference handling entities) to establish a configuration or distribution of interference handling functions among the participating entities. For example, the participating entities may signal each other their respective interference handling capabilities to agree which interference handling function is adopted by which participating entity.

Accordingly, multiple options for implementing interference handling can be provided by controlling distribution of individual interference handling functions between central and distributed interference handling entities to optimize performance and/or communication overhead of at least one of central and distributed interference handling entities.

Effectively, the total interference handling functionality is partitioned into different stages or levels of interference handling functions (e.g. channel/time-slot allocation, scheduling activities etc.) in a particular manner so as to make sure that an interference handling system can utilize a centralized and/or a distributed approach or a hybrid approach. More specifically, respective portions of the total interference handling work can be assigned to a central controller, to an access point, or to a combination of both. To achieve this, the involved controllers (whether centralized or distributed) are configured to switch interference handling operating modes.

According to a first option of the first or second aspect, wherein the interference handling functions may relate to different levels, wherein an interference handling function of a lower level may be dependent on an outcome of an interference handling function of a higher level, and wherein interference handling functions assigned to the central interference handling entity may have a higher level than interference handling functions assigned to the distributed interference handling entity. Thereby, efficiency of interference handling can be increased by distributing interference handling functions based on their levels among central and distributed interference handling entities to reduce communication and/or processing load.

According to a second option of the first or second aspect, which may be combined with the first option, the interference handling functions may comprise a first interference handling function of a highest level for assigning time slots or time channels to access points of the optical wireless communication network, a second interference handling function of a middle level for allocating allowed time regions to access points for each endpoint or group of endpoints, and a third interference handling function of a lowest level for scheduling time slots to endpoints for each access point. Thereby, the total interference handling functionality can be split into different levels of interference handling that can be distributed among the central and distributed interference handling entities to optimize performance and/or communication overhead of at least one of central and distributed interference handling entities. This may advantageously also involve scheduling additional time slots to a node outside of its pre-allocated time slots.

According to a third option of the first or second aspect, which may be combined with the first or second option, the interference handling operating mode may define which of the interference handling functions is/are executed by the central interference handling entity and which of the interference handling functions is/are executed by the distributed interference handling entity. This allows simple control of the proposed distribution of interference handling function by selecting a suitable one of a plurality of pre-selected or pre-set operating modes.

According to a fourth option of the first or second aspect, which may be combined with any one of the first to third options, a first operating mode may be selected, in which the central interference handling entity executes the first to third interference handling functions and the distributed interference handling entity executes no interference handling function may be selected, or a second operating mode may be selected, in which the central interference handling entity executes the first and second interference handling functions and the distributed interference handling entity executes the third interference handling function, or a third operating mode may be selected, in which the central interference handling entity executes the first interference handling function and the distributed interference handling entity executes the second and third interference handling functions, or a fourth operating mode may be selected, in which in which the central interference handling entity executes no interference handling function and the distributed interference handling entity executes the first to third interference handling functions. Thereby, a flexible distribution of the interference handling functionality can be achieved by allowing selection of various operating modes including fully centralized, partly centralized and fully decentralized interference handling configurations to cover cases where either no central network controller is provided or the distributed network entities should be kept as simple as possible and cases where it is advantageous to ensure that at least the first interference handling function is executed in a centralized manner and at least the third interference handling function is executed in a decentralized manner.

A particularly advantageous mode of operation is the abovementioned second operating mode wherein both time-slot/time-channel allocation for access points and time region allocation to access points for each endpoint (or group of endpoints) is handled centrally. This allows for optimization of channel utilization as all information is available centrally, at the cost of a modest increase in communication overhead, yet leaves the fine-grained decision scheduling of actual time-slots to end ponts for access points at the distributed interference handling entities. By centrally prescheduling the time-regions, resource requirements at the distributed interference handlers are lower than for modes whereby both time-region and time-slot allocation are to be handled allocated locally.

According to a third aspect, an access point for providing access to an optical wireless communication system is provided, the access point comprising a distributed interference handling entity an apparatus according to the first aspect, wherein the apparatus is comprised in the access point or in the interference handling entity. The access point may comprise a plurality of transceivers and may be capable of MISO (multiple receivers, single transmitter) or MIMO (multiple receivers, multiple outputs) optical wireless communication. Alternatively, the transceivers may be housed separately from the access point and may be coupled using an electrical or optical link. The distributed interference handling entity may thus also perform the functions of the apparatus of the first aspect, or the apparatus may be a separate entity that deals with the configuration of interference handling and the distributed interference handling entity may perform the allocated interference handling functions.

According to a fourth aspect, a network controller for providing a global master function of an optical wireless communication system is provided, the network controller comprising a central interference handling entity and an apparatus according to the first aspect, wherein the apparatus is comprised in the network controller or in the central interference handling entity.

The central interference handling entity may thus also perform the functions of the apparatus of the first aspect, or the apparatus may be a separate entity that deals with the configuration of interference handling and the central interference handling entity may perform the allocated interference handling functions.

According to a first option of the fourth aspect, which can be combined with any one of the first to fourth options of the first or second aspect, the apparatus may be configured to delegate at least one of the interference handling functions to the distributed interference handling entity or to the central interference handling entity in response to the selected operating mode. Thereby, communication load at the network controller can be reduced by delegating interference handling function(s) to distributed interference handling entities (e.g. APs).

According to a second option of the fourth aspect, which can be combined with the first option of the fourth aspect or any one of the first to fourth options of the first or second aspect, the distributed interference handling entity may be instructed by the central interference handling entity as to which restriction rules the distributed interference handling entity should apply in the delegated at least one interference handling function. This measure ensures that the central and distributed interference handling entities apply the same restriction rules to prevent collisions or mismatches (e.g. in connection with assignment of time slots or time channels) and to ensure proper functioning of the whole interference handling system.

According to a third option of the fourth aspect, which can be combined with the first or second option of the fourth aspect or any one of the first to fourth options of the first or second aspect, the delegated at least one of the interference handling functions may comprise a function for allocating allowed time regions per endpoint or group of endpoints to an access point of the optical wireless communication network and a function for scheduling individual time slots per endpoint to an access point.

According to a fourth option of the fourth aspect, which can be combined with any one of the first to third options of the fourth aspect or any one of the first to fourth options of the first or second aspect, the network controller may be connected to a backbone network and configured to manage the optical wireless network. Thus, a network controller (e.g. LiFi controller) responsible for managing the optical wireless network can be used to provide the central interference handling function with adaptive distribution of interference handling function.

According to a fifth aspect, an optical wireless communication system is provided, that comprises a network controller according to the fourth aspect and at least one access point according to the third aspect.

According to an option of the fifth aspect which can be combined with any one of the first to fourth options of the fourth aspect or any one of the first to fourth options of the first or second aspect, the central or distributed interference handling entity may be configured to set a time window which determines how long an endpoint is assumed to stay in a coverage area of a neighbor access point after a receipt of a last presence reporting indicating the endpoint. This measure provides the advantage that performance requirements and communication overhead for a time slot or time channel reservation aspect of the interference handling function(s) can be relaxed by applying a larger time window in which detected neighbor APs are stored and treated as neighbors.

According to a sixth aspect, a computer program product is provided, which comprises code means for producing the steps of the above method of the second aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the access point of claim 5, the network controller of claim 6, the optical wireless communication system of claim 11, the method of claim 13, and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 3 shows schematically MAC cycles of access points and their division into time slots;

FIGS. 4A and 4B show schematically LiFi infrastructures with overlapping coverage areas of neighboring access points and endpoints and examples of neighbor reporting by an endpoint and an access point, respectively;

FIG. 5 shows schematically a MAC cycle with a common channel for neighbor reporting;

DETAILED DESCRIPTION OF EMBODIMENTS

Various embodiments of the present invention are now described based on an optical multi-cell illumination and communication (LiFi) system.

Throughout the following, a luminaire as an access point is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics based with the light source coupling in light in the fiber core or "light pipe" and coupling out the light at the other end.

It is noted here that the access points for optical wireless communication may be integrated with luminaires or may be dedicated access points, or could optionally be co-located with WiFi access points.

Figure 1:
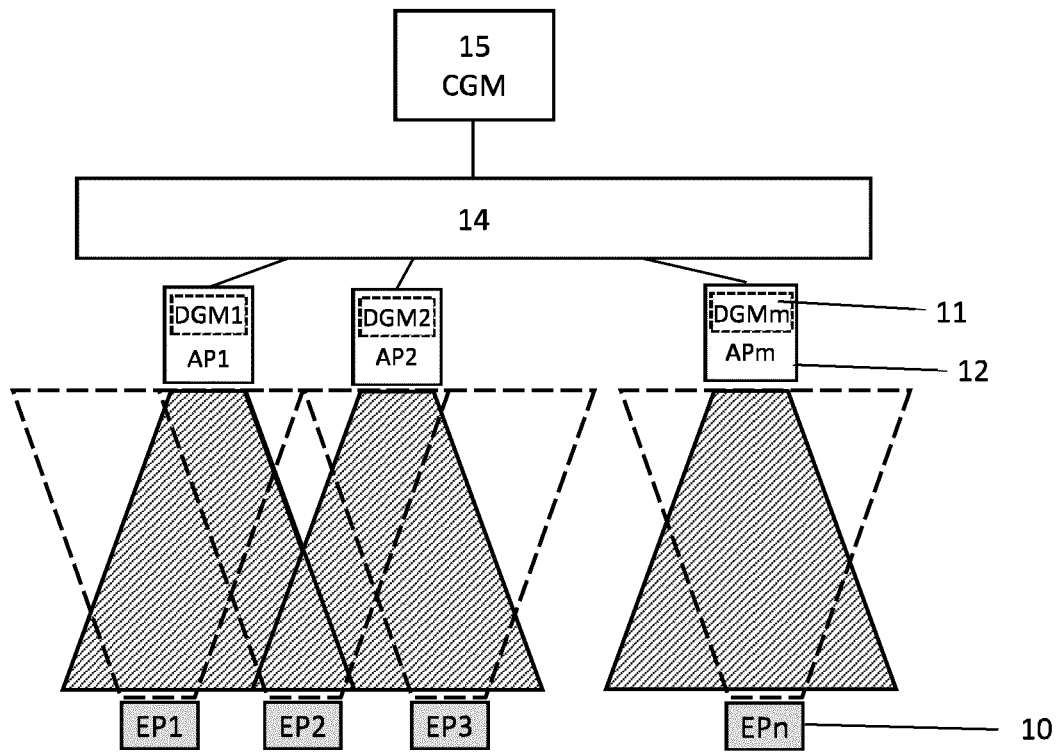
FIG. 1 shows schematically a block diagram of a LiFi network in which various embodiments can be implemented.

FIG. 1 shows schematically a block diagram of a LiFi network in which various embodiments can be implemented.

It is noted that—throughout the present disclosure—the structure and/or function of blocks with identical reference numbers that have been described before are not described again, unless an additional specific functionality is involved. Moreover, only those structural elements and functions are shown, which are useful to understand the embodiments. Other structural elements and functions are omitted for brevity reasons.

The LiFi network comprises multiple access-points (APs) AP1, AP2, . . . APm 12, e.g. luminaires of a lighting system, connected to a backbone network (e.g. Ethernet or the like) 14 via a switch (e.g. an Ethernet switch, not shown), whereby each AP 12 controls one or multiple transceivers (not shown) (i.e. combined transmitters (optical emitters) and receivers (light sensors)) for optical communication towards end points (EP) EP1, EP2, . . . EPn 10, e.g., mobile user devices. Each of the EPs 10 is registered to an AP 12. Respective downlink light beams generated by the transceivers of the APs 12 and defining coverage areas on the plane(s) of the EPs 10 are indicated by hashed trapezoids in FIG. 1. Furthermore, respective light beams generated by the transceivers and defining coverage areas on the plane(s) of the EPs 10 are indicated by the hatched trapezoids in FIG. 1. Similarly, respective light beams generated by transceivers of the EPs 10 and defining coverage areas on the plane(s) of the APs 12 are indicated by the dashed trapezoids in FIG. 1

Where their coverage areas overlap, interference of the communication between APs 12 and EPs 10 can occur. Coordination of the APs 12 is therefore needed to handle the interference.

A central global master entity or function (CGM) 15, provided e.g. in a LiFi controller, is connected to the backbone network 14 and configured to manage the LiFi network, which includes interference handling coordination. Furthermore, the central global master entity 15 may be configured to control handover when one of the EPs 10 moves into and out of overlapping coverage areas of the APs 12. The central global master entity 15 may be connected via a switch of the backbone network 14 to the APs 12.

According to various embodiments, the global master functionality or at least the interference coordination functionality can be shared between the central global master entity and respective distributed global master entities (DGM) DGM1, DGM2, . . . DGMm 11 provided in or at the APs 12. Thereby, at least some interference handling functions can be distributed over the APs 12.

Figures 2A, 2B:
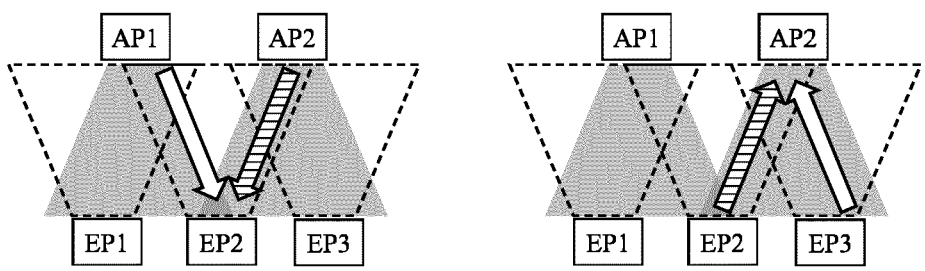
FIGS. 2A and 2B show schematically LiFi infrastructures with overlapping coverage areas of neighboring access points and endpoints and examples of downlink and uplink interference, respectively.

FIGS. 2A and 2B show schematically a LiFi infrastructure with overlapping coverage areas of neighboring APs (AP1 and AP2) and EPs (EP1 to EP3) and examples of downlink and uplink interference, respectively.

In the examples of FIGS. 2A and 2B, EP1 and EP2 are registered to AP1 and EP3 is registered to AP2. AP1 controls the communication with EP1 and EP2, while AP2 controls the communication with EP3.

As indicated by the arrows in FIG. 2A, downlink interference occurs at EP2 when AP1 and AP2 send at the same time. Furthermore, as indicated by the arrows in FIG. 2B, uplink interference occurs at AP2 when EP2 and EP3 send at the same time.

The interference handling functionality can be configured to handle interference at AP1 and AP2 by separating the communication for EP2 and EP3 in time (time division).

Therefore, interference handling can be implemented by providing time division multiple access (TDMA), wherein medium access control (MAC) cycles of the APs are aligned and divided into slots.

FIG. 3 shows schematically a time diagram with aligned MAC cycles (MAC-c) for two APs (AP1 and AP2) on top of each other and their division into time slots indicated by respective rectangular fields.

FIGS. 4A and 4B show schematically a LiFi infrastructure with overlapping coverage areas of neighboring APs (AP1 and AP2) and EPs (EP1 to EP3), similar to FIGS. 2A and 2B, wherein examples of neighbor reporting by an EP and AP, respectively, are shown by respective arrows.

To provide interference handling, the central and/or distributed interference handling entity (e.g. the central and/or distributed global managing functions 15, 11 in FIG. 1) require neighbor information, e.g., information on the presence of EP2 in the overlapping coverage area of AP1 and AP2.

In a downlink interference case shown in FIG. 4A, it is assumed that EP2 has just entered the coverage area of AP2 and detects AP2, e.g., based on a beacon or advertisement (hatched arrow) broadcast by AP2. In response thereto, EP2 reports the detection of the neighboring AP2 to AP1 (long white arrow) which forwards (short white arrow) the neighbor detection report to the interference handling functionality at the central or distributed global master entity (GM).

Similarly, in an uplink interference case shown in FIG. 4B, it is assumed that AP2 (to which EP3 is registered) has detected EP2 in its coverage area, e.g., based on a beacon or advertisement (hatched arrow) broadcast by EP2. In response thereto, AP2 reports the detection of the neighboring EP2 (short white arrow) to the interference handling functionality at the central or distributed global master entity (GM).

To support detecting that an EP is in the coverage area of a neighbor AP, a inter domain communication channel (IDCC) in the MAC cycle can be defined in which APs and/or EPs advertise their presence.

FIG. 5 shows schematically a MAC cycle (MAC-c) with the inter domain communication channel for neighbor reporting. In the example of FIG. 5, the MAC cycle comprises an inter domain common channel (IDCC) located at the end of the MAC cycle. Of course, the IDCC may be located at another predetermined location within the MAC cycle.

The access to the IDCC can be contention based (e.g. ALOHA operation procedure), contention free by coordinated scheduling, or a combination of both. The IDCC is split into two parts, one for the APs (IDCC-AP) and one for the EPs (IDCC-EP). An AP may regularly (e.g. at every MAC-cycle) transmit an advertisement frame in one of a plurality of available slots S-AP1 to S-APn of the IDCC-AP part to indicate its presence enabling an EP registered to an AP to detect if it is in in the coverage area of a neighbor AP (downstream detection). An EP may transmit an advertisement frame in one of a plurality of available slots S-EP1 to S-EPn of the IDCC-EP part to indicate its presence enabling a neighbor AP (of the AP to which the EP is registered) to detect if the EP is in its coverage area (upstream detection). The advertisement frame may be a short frame to limit the time it occupies and may contain identification information.

For downstream detection, an AP may initially access the IDCC-AP by randomly choosing a slot. Once the interference handling functionality of the central or distributed global master entity has learned or configured which APs can interfere (e.g. by using an interference map), it may allocate a slot to each AP to avoid interference. If the central or distributed global master entity has partial information on the interference map, it allocates a subset of slots to each AP from which the AP randomly selects to mitigate interference.

For upstream detection, an EP randomly chooses a slot in the IDCC-EP. Since the EPs are mobile, this access can be less controlled by the central or distributed global master entity. To mitigate collisions, the frequency of EPs accessing the IDCC-EP may be limited. An AP may determine which of its registered EPs should send an advertisement frame in the IDCC-EP at which time, e.g., by applying round robin scheduling scheme.

Figure 6:
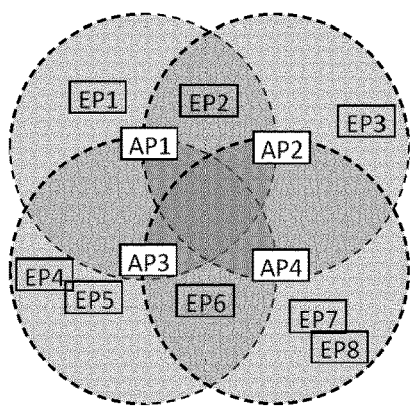
FIG. 6 shows schematically four access points with overlapping coverage areas and endpoints distributed over the coverage areas.

FIG. 6 shows schematically four APs AP1 to AP4 with overlapping coverage areas and EPs EP1 to EP 8 distributed over the coverage areas. In the example of FIG. 6, EP2 is located in an overlapping coverage area of AP1 and AP2, and EP6 is located in an overlapping coverage area of AP3 and AP4.

To handle interference, the interference handling functionality of the central or distributed global master entity can determine multiple time channels in the MAC-cycle and assign them to each of the APs. This time channel assignment can be based on reports received from the APs. The interference handling functionality of the central or distributed global master entity may rely on presence or neighbor reporting, indicating when an EP is in the coverage area of a neighbor AP, while it may rely less or even ignore non-presence reporting, indicating when an EP is no longer in the coverage area of a neighbor AP.

As a further option, the interference handling functionality of the central or distributed global master entity may determine a time window which indicates how long an EP is assumed to stay in the coverage area of a neighbor AP after the last presence reporting. This time window may be a long time window (e.g. minutes, hours, days, weeks), or a short time window (e.g. seconds or tens of milliseconds or hundreds of milliseconds).

Figure 7:
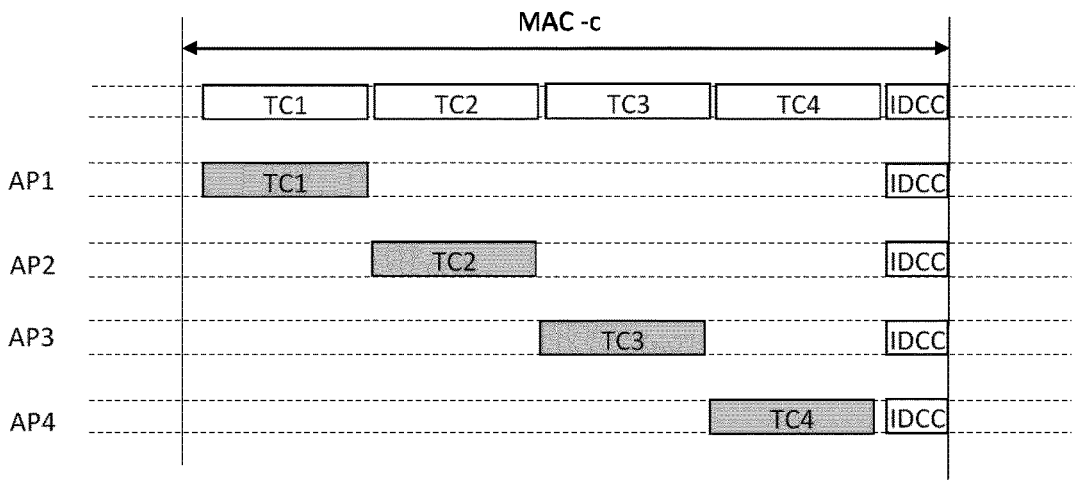
FIG. 7 shows schematically a MAC cycle with a time channel assignment to four access points.

FIG. 7 shows schematically a MAC cycle with a time channel assignment to four access points AP1 to AP4. Here, a first time channel TC1 is assigned to AP1, a subsequent second time channel TC2 is assigned to AP2, a subsequent third time channel is assigned to AP3 and a subsequent fourth time channel TC4 is assigned to AP4.

In the scheduling example of FIG. 7, the interference handling functionality has applied a long time window during which a report about the presence of an EP occurred in each of the overlapping coverage areas of the four APs. Therefore, the interference handling functionality has assigned a different time channel to each of the four APs.

Furthermore, the interference handling functionality can determine interference-free time slots or groups of time slots, whereby the latter can be regarded as time channels in the context of this disclosure. A time channel can consist of a group of adjacent time slots, a group of non-adjacent time slots or a combination of both. It may however not be necessary that all slots in a MAC cycle are assigned to a time channel or IDCC. E.g., the time channels of FIG. 7 may also be smaller leaving larger gaps with multiple slots in between them.

Furthermore, to avoid interference, the interference handling functionality may require that each AP restricts the communication with its registered EPs to its assigned time channel. Although this rule may solve the interference problem, it may lead to a sub-optimal performance of the optical wireless communication system.

In a less strict approach, the interference handling functionality may conditionally allow each AP to communicate with its registered APs outside its assigned time channel. In that case, the interference handling functionality applies a set of rules determining the conditionality.

In an example, the following set of rules may be applied to allow conditional scheduling of data communication outside an assigned time channel while still solving the interference problem:

For every EPx registered to an APx with assigned time channel x and reported to be in the coverage area of APy:
1. Communication of APx with EPx is restricted to time channel x; and
2. Communication of APy with EPs registered to APy is restricted by excluding time channel x.

According to the example of FIG. 7, the interference handling functionality has assigned the first time channel TC1 to AP1 and the second time channel TC2 to AP2. Assuming now that EP1 and EP2 of FIG. 6 have been registered to AP1 and EP3 to AP2, then AP1 restricts communication with EP2 to time channel TC1 and AP2 restricts communication with EP3 by excluding it from time channel TC1.

Figure 8:
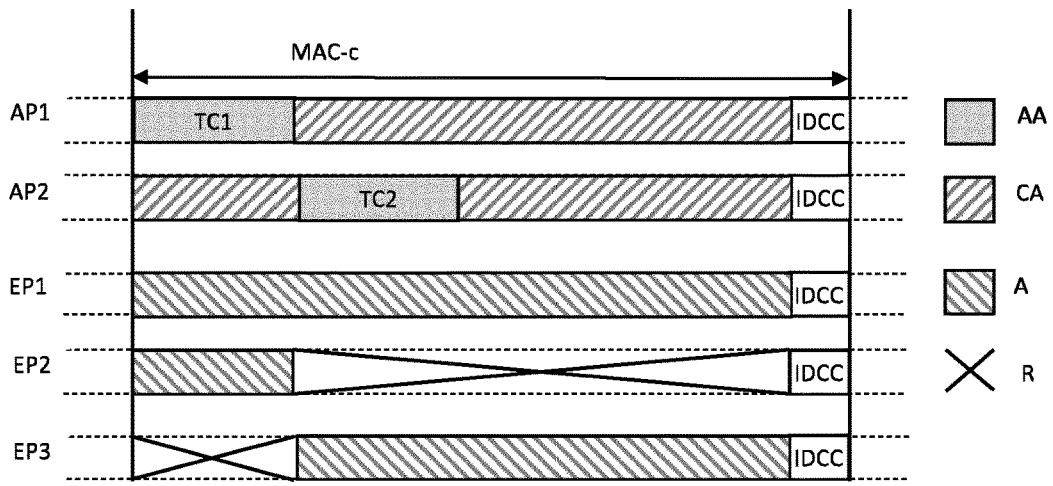
FIG. 8 shows schematically a MAC cycle with endpoint-related restriction rules.

FIG. 8 shows schematically a MAC cycle in which the endpoint-related restriction rules for AP1 and AP2 of the above example are indicated. A grey area corresponds to a time channel that is always allowed (AA) for scheduling of a certain AP, a hatched area inclined upwards towards the right direction indicates a part of the MAC-cycle that is conditionally allowed (CA) for a certain AP, a hatched area inclined upwards towards the left direction indicates a time channel that is allowed (A) for a certain EP, and a crossed area indicates a time channel that is restricted (R) and cannot be assigned for a certain EP.

As indicated in FIG. 8, AP1 is unconditionally allowed to schedule communication within the first time channel TC1 and conditionally in the remaining time of the MAC-cycle (except for the IDCC which is used as described before). Furthermore, AP2 is unconditionally allowed to schedule communication within the second time channel TC2 and conditionally in the remaining time of the MAC-cycle (except for the IDCC which is used as described before). EP3 is thus excluded from the first time channel TC1. EP1 is allowed to communicate on the whole MAC-cycle (except IDCC), while EP2 is allowed to communicate on the first channel TC1 only and EP3 is allowed to communicate on the whole MAC-cycle except for the first time channel TC1 (and IDCC).

According to various embodiments, various interference handling functions and operating modes can be defined to allow for a sharing or distribution of the interference handling functionality among central and distributed interference handling entities provided e.g. at the central and distributed global master entities, respectively.

Each of these interference handling functions can have a certain level, whereby a function of a certain level depends on the result of a function of one higher level.

In an example, the following interference handling functions can be defined:
A. applying a pre-reservation (e.g. assignment of groups of time slots or time channels to APs);
B. defining restriction rules (e.g. allocation of allowed time regions per EP or group of EPs for each AP (given the pre-reservation defined by function A); and
C. scheduling time slots (e.g. scheduling of individual time slots per EP to each AP (given the allowed time regions defined by function B).

These interference handling functions A to C are dependent on one another, meaning that function B works with the result of function A and function C with the result of function B.

Furthermore, the operating modes define how the above interference handling functions A, B and C can be distributed between or shared among the central or distributed interference handling entity. Depending on the operating mode, a predetermined first part (i.e. predetermined interference handling function(s)) of the interference handling functionality is executed in a central interference handling entity (e.g. CGM 15 in FIG. 1) and a predetermined second part (i.e. remaining interference handling function(s)) of the interference handling functionality is executed in distributed interference handling entities (e.g. DGMs 11 in FIG. 1), e.g., at the APs.

In an example, the following four operating modes may be implemented:

A first operating mode (Mode 0) may correspond to a fully centralized interference handling functionality where the central interference handling entity executes all three interference handling functions A to C, and the distributed interference handling entities execute no interfere handling function.

Furthermore, a second operating mode (Mode 1) may correspond to a first shared interference handling functionality where the central interference handling entity executes the pre-reservation and restriction rules functions A and B, and the distributed interference handling entities execute the time-slot scheduling function C.

Additionally, a third operating mode (Mode 2) may correspond to a second shared interference handling functionality where the central interference handling entity executes the pre-reservation function A, and the distributed interference handling entities execute the restriction rules and time-slot scheduling functions B and C.

Finally, a fourth operating mode (Mode 3) may correspond to a fully distributed or decentralized interference handling functionality where the central interference handling entity executes no interference handling function, and the distributed interference handling entities execute the all interference handling functions A to C.

Thus, depending on its implemented or set operating mode, a central interference handling entity may comprise interference handling function A or A+B or A+B+C. Similarly, depending on its implemented or set operating mode, a distributed interference handling entity (e.g. AP) may comprise interference handling function C or B+C or A+B+C.

Consequently, according to various embodiments, multiple options for implementing interference handling can be applied to reduce the required performance and/or communication overhead for a central interference handling entity.

According to a first option, a central global master entity (e.g. LiFi controller) or a distributed global master entity (e.g. AP) may adopt the needed effort and communication overhead for the interference handling function A by choosing an appropriate time window in which it regards an EP to be no longer in the coverage area of a neighbor AP after the last presence reporting. In this case, the central or distributed global master entity may reduce the required effort and communication overhead by increasing this time window.

In an example, to keep track of neighbor relations between the APs, the central or distributed global master entity can keep these relations in a visibility matrix (e.g. lookup table). The following table represents an example of such a visibility matrix for the situation of FIG. 6 (EP2 and EP6 in overlapping coverage areas), wherein a mark "x" in the table indicates that an EP is currently in the overlapping coverage area of two APs. In FIG. 6, this is the case for the overlapping area of AP1 and AP2 (i.e. EP2) and the overlapping area of AP3 and AP4 (i.e. EP6).

|     | AP1 | AP2 | AP3 | AP4 |
| --- | --- | --- | --- | --- |
| AP1 |     | x   |     |     |
| AP2 | x   |     |     |     |
| AP3 |     |     |     | x   |
| AP4 |     |     | x   |     |

In the above case, the table represents the actual situation, meaning that the central or distributed global master entity removes the mark "x" when it does not receive an update report for an EP being in the overlapping coverage area of two APs within a short time window starting from the latest corresponding reporting.

However, if the central or distributed global master entity applies a longer time window, it may receive multiple update reports for two APs before it removes the corresponding mark "x" in the table. By applying a very long time window (e.g. days or weeks) the central or distributed global master entity may accumulate more marks "x" in the visibility matrix than EPs are actually detected in overlapping areas.

The following table represents the visibility matrix for such a long time window thereby assuming that reporting of EPs have occurred for each overlapping coverage area of the APs of FIG. 6 within that window.

|     | AP1 | AP2 | AP3 | AP4 |
| --- | --- | --- | --- | --- |
| AP1 |     | x   | x   | x   |
| AP2 | x   |     | x   | x   |
| AP3 | x   | x   |     | x   |
| AP4 | x   | x   | x   |     |

Thus, the advantage of using a short time window compared to a long time-window is that the visibility matrix is filled with less marks "x" enabling the central or distributed global master entity to calculate less interference free time channels.

Figure 9:
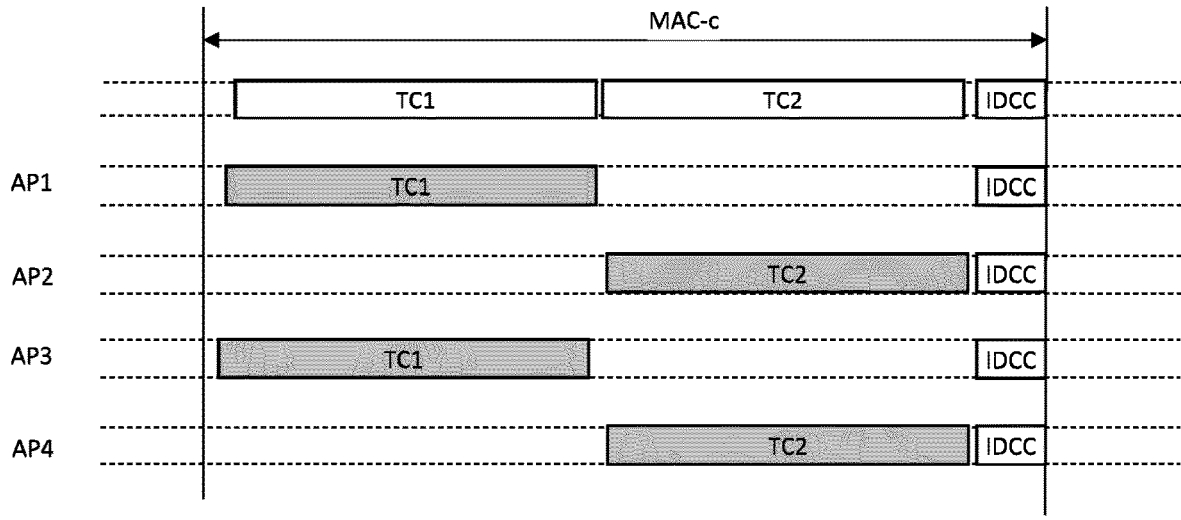
FIG. 9 shows schematically a first example of a distribution of interference handling functions according to an embodiment.

FIG. 9 shows schematically a MAC cycle with a time channel assignment to four access points in case of a shorter update time window. Here, only two longer time channels TC1 and TC2 can be provided in each MAC cycle and shared among two respective APs. I.e., a first time channel TC1 is shared by AP1 and AP3 and a second time channel TC2 is shared among AP2 and AP4, so that every AP gets access to every second one of its assigned time channel.

If less time channels are needed, the available time of the MAC cycle allows for larger time channels. Less time channels are needed when less EPs occur in overlapping coverage areas of the APs. In the extreme situation that there is no EP present and/or detected in any overlapping coverage area, one time channel would be sufficient meaning that every AP is allowed to schedule communication with its EPs in the whole MAC-cycle (except for the IDCC). In the other extreme situation that for every AP an associated EP is in the coverage area in each of its neighbor APs, four channels are needed assuming that only direct neighbor APs have overlapping coverage area and time-channel optimal time-channel assignment is arranged.

However, to represent the actual situation, the central and/or distributed global master entity needs to be configured to rely on more frequent updates of the neighbor detection reports and update its visibility matrix accordingly. Moreover, the central and/or distributed global master entity must recalculate the time channels at every change of the visibility matrix.

If the central and/or distributed global master entity applies a long time window, it does not need very frequent updates of neighbor detection reports and does not need to update its visibility matrix frequently. This relaxes the performance requirement on the central and/or distributed global master entity to update the calculation of the time-channels.

As a result, a centralized or distributed global master entity can relax its performance requirements and its communication overhead for interference handling function A (time channel reservation) by applying a larger time window in which it keeps detected neighbor APs as being neighbors.

According to a second option, a central global master entity which comprises interference handling functions A and B may reduce its required performance and communication overhead with distributed global master entities by delegating the interference handling function B to one or multiple distributed global master entities supporting the interference handling function B.

Figure 10:
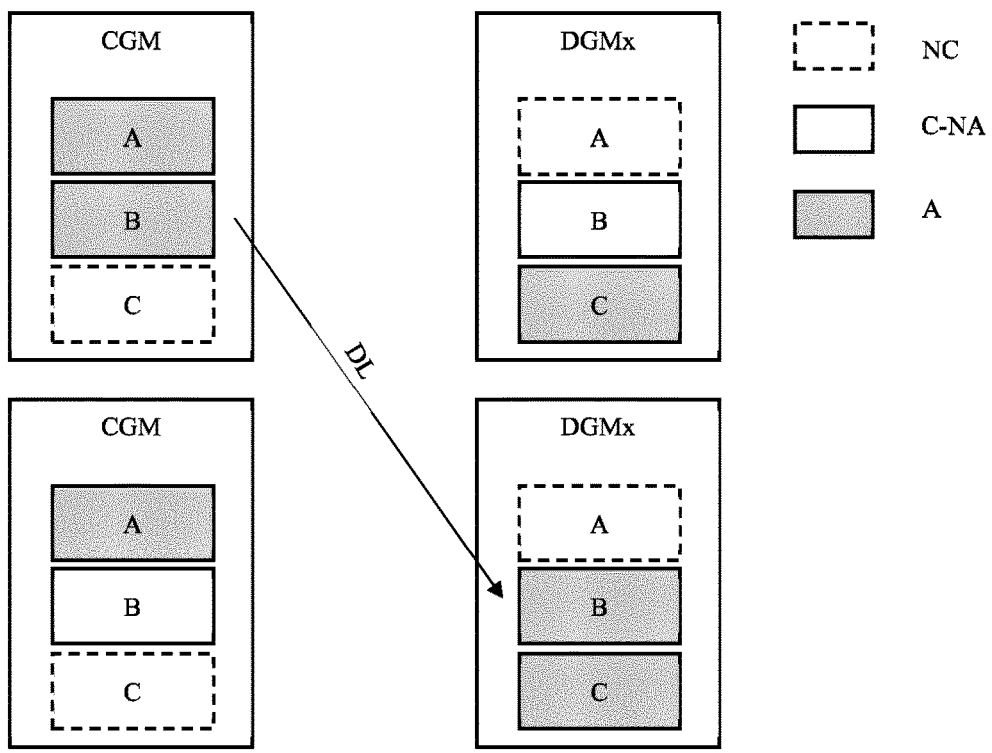
FIG. 10 shows schematically a second example of a distribution of interference handling functions according to an embodiment.

FIG. 10 shows schematically on top of each other a first example of initial and subsequent distributions of interference handling functions according to an embodiment based on the second option.

In the first example, the central global master entity (CGM) comprises and has activated interference handling function A (pre-reservation) and interference handling function B (allowed region), as indicated by the grey areas ("A" for "active"). It does not comprise interference handling function C, as indicated by the dotted area ("NC" for "not comprised"). Now, it determines that a distributed global managing function (DGM) comprises or is capable of interference handling function B (allowed region) and interference handling function C (time-slot allocation), wherein interference handling function C is active and interference handling function B is comprised but not active (continuous frame area "C-NA" for "comprised, not active"). The detected distributed global managing function does not comprise interference handling function A, as indicated by the dotted area ("NC" for "not comprised").

Initially, as indicated in the upper part of FIG. 10 the central global master entity may execute (i.e. have activated) both interference handling functions A+B and the distributed global master entity may execute (i.e. have activated) only the interference handling function C. Once the central global master entity has pre-reserved time-channels according to interference handling function A, it can determine an allowed region for each AP and each of its registered EPs in which communication is allowed (interference handling function B). It thereby may apply certain rules to determine these regions.

To relax its performance requirement and/or to relax communication overhead over the backbone network, the central global master entity may delegate (DL) the interference handling function B to the distributed global master entity e.g. by a corresponding negotiation process between the central and distributed global master entities, as indicated in the lower part of FIG. 10. As a result, the interference handling function B is activated at the distributed global master entity and is deactivated (but still comprised) at the central global master entity.

In examples, different central and distributed global master entities apply the same rules on executing interference handling function B (i.e. allocation of allowed time regions per EP) in either a central approach or distributed approach to enable freedom and flexibility of use of the interference handling function B and proper functioning of the interference handling system. To achieve this, a central global master entity may configure a distributed global master entity of an AP, thereby instructing (e.g. in the course of the negotiation process) which restriction rules the distributed global master entity should apply. This can be achieved by defining a set of restriction rules which the distributed global master entity should have implemented. In an example, the central global master entity may indicate which set of restriction rules a distributed global master entity shall select and use. Another possibility is to apply a meta language that the central global master entity applies to insert a desired functionality (e.g. restriction rules) into a distributed global master entity. Obviously, these flexibility options put additional requirements on the distributed global master entity and may be accompanied by security measures to avoid misusage.

A central global master entity is thus allowed to delegate interference handling function B (i.e. allocation of time-regions for a certain AP) to the distributed global master entity of that AP. This AP must then comprise this distributed global master entity with this (same) interference handling function B of course.

In an example, if all APs support the interference handling function B, this function can be completely executed in a fully distributed manner. This enables a system with a central global master entity that does not comprise interference handling function B.

The other extreme is that a central global master entity does not distribute this interference handling function B at all, which enables a system in which no AP comprises or must execute the allocation of allowed time-regions.

The approach of defining a standardized allocation of interference handling function B also enables to build a system with different AP implementations, whereby part of them may comprise a distributed global master entity with allocation of time regions and part of them does not comprise this interference handling function B. This allows to build a system with such mixture of AP implementations and the system to work correctly.

According to a third option, a central global master entity which comprises interference handling functions A, B and C may reduce its required performance and communication overhead with distributed global master entities by delegating the interference handling function C to one or multiple distributed global master entities supporting the interference handling function C.

Once the central and/or distributed global master entity has allocated allowed time regions for each EP or group of EPs per AP, it can determine a slot schedule per EP. To enable freedom of executing this slot scheduling according to interference handling function C, it can be either executed centrally or distributed. In a central approach, the central global master entity may take all kinds of information into account that might not be available in the individual APs. The central global master entity may e.g. determine that an EP that is in the coverage area of two APs may be better served by one of the two, e.g., due to actual traffic load on these APs.

However, such a centralized approach may lead to vary heavy performance requirements on the central global master entity and very heavy communication overhead on the backbone network, which can be relaxed by letting the APs execute the interference handling function C (slot scheduling).

Figure 11:
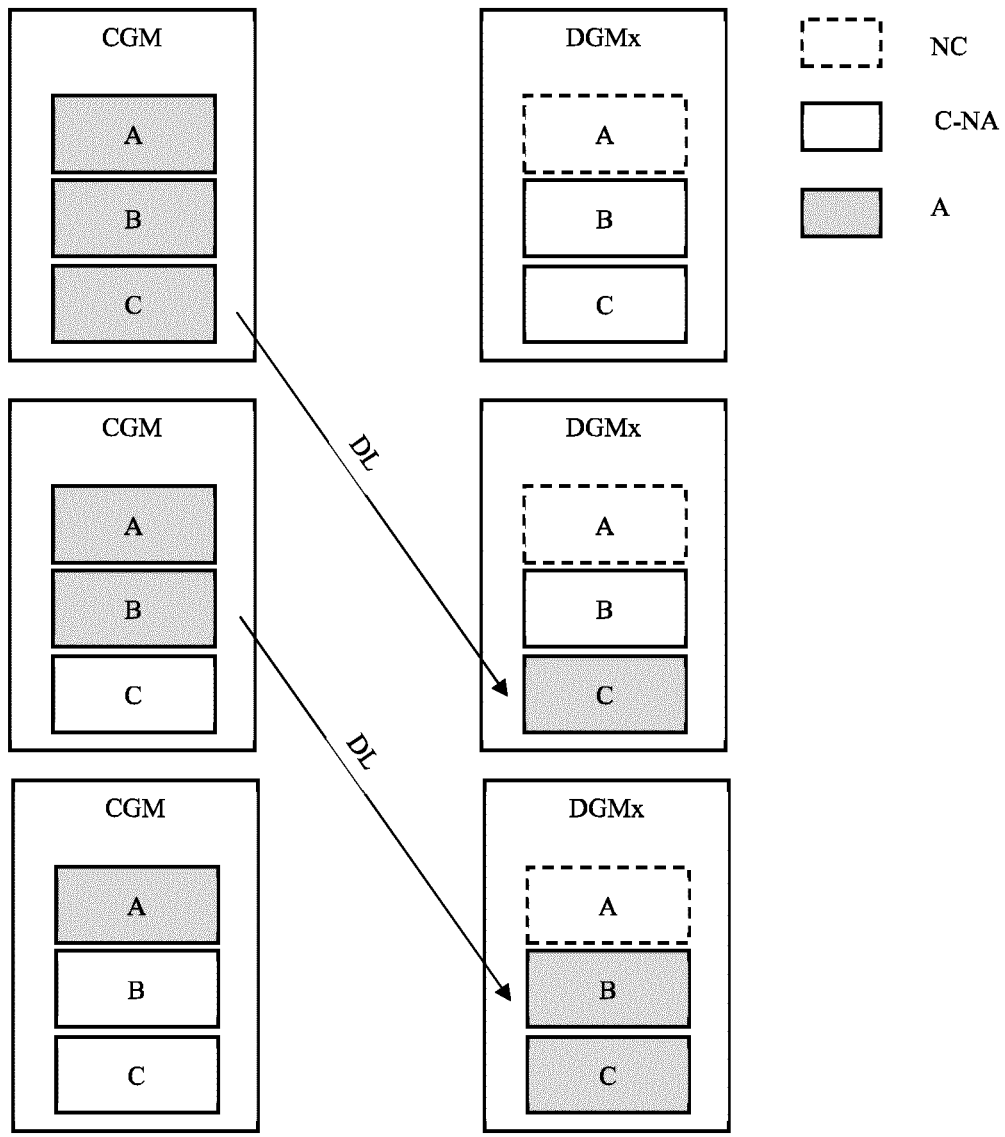
FIG. 11 shows schematically a MAC cycle with a time channel assignment to four access points in case of a shorter update time window.

FIG. 11 shows schematically a second example of a distribution of interference handling functions according to an embodiment. The markings of the different characteristics of the interference handling functions A to C correspond to those of FIG. 10 and are not explained again here.

As indicated in the most upper part of FIG. 11, a central global master entity (CGM) may comprise and have activated interference handling function A (pre-reservation), interference handling function B (allowed regions) and interference handling function C (slot scheduling). It determines (e.g. through a negotiation process or the like) that a distributed managing unit (DGM) comprises but has not activated interference handling functions B and C and does not comprise interference handling function A.

Initially, the central global managing function may execute interference handling functions A+B+C.

To relax its performance requirement and to relax the communication overhead over the backbone, the central global managing function may delegate (DL) and have activated the interference handling function C to the distributed global managing function, e.g., by a corresponding negotiation process or the like, as indicated in the middle part of FIG. 11.

As a further step, the central global managing function may also delegate and have activated the interference handling function B to the distributed global managing function, as indicated in the lowest part of FIG. 11.

In the following, various embodiments of central and distributed interference handling entities with different distribution of interference handling functions are presented.

In an embodiment, a central interference handling entity (e.g. the central global master entity) may comprise interference handling functions A and B and may be configured to be set (e.g. by a mode selector based on a negotiation operation) to the second operating mode (Mode 1), where interference handling is shared with one or multiple distributed interference handling entities (e.g. distributed global master entity) comprising interference handling function C.

In case the central interference handling entity determines (e.g. based on a negotiation operation) that a distributed interference handling entity of an AP supports the interference handling function B, it may delegate the execution of the interference handling function B for this AP to this AP and operate in the third operation (Mode 2) with it. It is then required that the central interference handling entity and the distributed interference handling entity apply the same restrictions rules for their interference handling function B. This can be achieved as part of the negotiation operation between the central and distributed interference handling entities.

In a further embodiment, a central interference handling entity (e.g. the central global master entity) may comprise interference handling functions A, B and C and may be configured to be set (e.g. by a mode selector based on a negotiation operation) to the first operating mode (Mode 0), where interference handling is fully centralized at the central interference handling entity.

In case the central interference handling entity determines (e.g. based on a negotiation operation) that a distributed interference handling entity of an AP supports the interference handling function C, it may delegate the execution of the interference handling function C for this AP to this AP and operate in the second operating mode (Mode 1) with it.

Furthermore, in case the central interference handling entity determines (e.g. based on a negotiation operation) that a distributed interference handling entity of an AP supports the interference handling functions B and C, it may delegate the execution of the interference handling functions B and C for this AP to this AP and operate in the third operating mode (Mode 2) with it. It is then required that the central interference handling entity and the distributed interference handling entity apply the same restrictions rules for their interference handling function B. This can be achieved as part of the negotiation operation between the central and distributed interference handling entities.

In a further embodiment, a distributed interference handling entity (e.g. a distributed global master entity such as an AP) may be set (e.g. by a mode selector in response to a negotiation operation or the like) to the fourth operating mode (Mode 3) and then comprises activated interference handling functions A, B and C. In this case, it may operate in the fourth operating mode in cooperation with neighbor distributed interference handling entities for achieving the interference handling function A.

In case the distributed interference handling entity detects a central interference handling entity with interference handling function A, it may be set to the third operating mode (Mode 2) (e.g. by a mode selector based on a negotiation process or the like) when the central interference handling entity executes the interference handling function A for the distributed interference handling entity.

Furthermore, in case the distributed interference handling entity detects a central interference handling entity with interference handling functions A and B, it may be set to the second operating mode (Mode 1) (e.g. by a mode selector based on a negotiation process or the like) when the central interference handling entity executes the interference handling functions A and B for the distributed interference handling entity.

For handling interference, the global and/or distributed global master entity receives neighbor detection reports to determine which APs are to be regarded as neighbor APs. When the global and/or distributed global master entity receives a report on the detection of a neighbor second AP for a certain first AP, it regards these two APs as being neighbors. After the initial detection, it expects regular update reports on this detection for as long as this situation remains. When the GM does not detect an update detection report for a certain time for these two neighboring APs, it no longer regards the two APs as neighbors.

Figure 12:
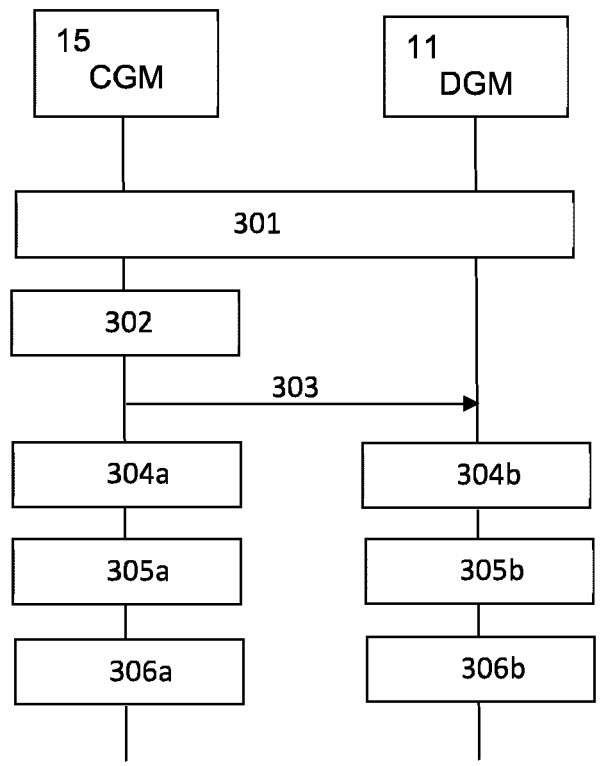
FIG. 12 shows schematically a processing and signaling diagram for central and distributed interference handling entities according to an embodiment.

FIG. 12 shows schematically a signaling and processing sequence for coordinating central and distributed interference handling entities according to an embodiment.

In the signaling and processing sequence of FIG. 12, the vertical direction from the top to the bottom corresponds to the time axis, so that messages or processing steps shown above other messages or processing steps occur at an earlier time.

As indicated in the top portion of FIG. 12, the processing steps and messages occur at or between a central global master entity (CGM, e.g. LiFi controller) 15 and a distributed global master entity (DGM, e.g. AP) 11.

In a first processing and signaling step 301, information about their interference handling capabilities is exchanged between the central global master entity 15 and the distributed global master entity 11 by a negotiating process.

Then, in step 302, the central global master entity 15 selects one of the four operating modes (Mode 0, 1, 2 or 3) based on the determined interference handling capabilities of the distributed global master entity 11.

Thereafter, in step 303, the central global master entity 15 may delegate at least one interference handling function to the distributed global master entity 11 based on the selected operating mode. Alternatively, the central controller may however decide to operate in mode 0. In that case, it does not delegate an interference handling function.

In subsequent steps 304a and 304b (wherein step 304a is performed at the central global master entity 15 and step 304b is performed at the distributed global master entity 11), interference handling function A is activated/deactivated based on the selected delegation.

Furthermore, in subsequent steps 305a and 305b (wherein step 305a is performed at the central global master entity 15 and step 305b is performed at the distributed global master entity 11), interference handling function B is activated/deactivated based on the selected delegation.

Finally, in subsequent steps 306a and 306b (wherein step 306a is performed at the central global master entity 15 and step 306b is performed at the distributed global master entity 11), interference handling function C is activated/deactivated based on the selected delegation.

The delegation in step 303 can also be an inverse delegation indicating that an interference handling function previously delegated in the negotiation process to a distributed global master entity 11 is reversed. A delegation may be initiated by the central global master entity 15 as the arrow for step 303 in FIG. 12 suggests but may also be initiated by the distributed global master entity 11.

Reasons for initiating a delegation of an interference handling function from the central global master entity 15 to the distributed global master entity 11 can be to relax the required performance of the central global master entity 15, to relax communication effort between the central global master entity 15 and the distributed global master entity 11, and/or to make an AP (distributed global master entity 11) less dependent on the central global master entity 15. Reasons for initiating a (reverse) delegation of an interference handling function from the distributed global master entity 11 to the central global master entity 15 can be to relax the required performance of the distributed global master entity 11 and/or to improve the overall performance of the system regarding the interference handling.

The following messages supporting the negotiation process between the central global master entity 15 and a distributed global master entity 11 can be used:

On interference handling capabilities: Request for interference handling capabilities; response indicating interference handling capabilities.

On delegation: Request to execute an interference handling function by the other entity; response indicating to accept/reject executing the requested interference handling function from the other entity. Note that as suggested by the arrow of step 303 in FIG. 12, such request is typically initiated by the central global master entity 15 but may also be initiated by a distributed global master entity 11.

On reverse delegation: Request to no longer execute an interference handling function by the other party; response indicating to accept/reject of no longer executing the requested interference handling function from the other entity. Note that as suggested by the arrow of step 303 in FIG. 12, such request is typically initiated by the central global master entity 15 but may also be initiated by a distributed global master entity 11.

Thereby, the total interference handling functionality can be distributed among central and distributed global master entities to provide an effective and efficient interference handling performance.

The following indicates the communication over the backbone network for the interference handling functionality for various operating modes.

When a central and distributed global master entity pair operates in mode 0 (interference handling functions A, B and C executed at the central global master entity 15), the distributed global master entity 11 comprised in an AP informs the central global master entity 15 about which of the EPs registered to the AP have detected which neighbor APs and which neighbor EPs the AP has detected. The central global master entity 15 provides a schedule of the individual slots for the MAC cycle to the distributed global master entity 11.

When a central and distributed global master entity pair operates in mode 1 (interference handling functions A and B executed at the central global master entity 15, interference handling function C executed at the distributed global master entity 11), the distributed global master entity 11 comprised in an AP informs the central global master entity 15 about which of the EPs registered to the AP have detected which neighbor APs (and which neighbor EPs the AP has detected). The central global master entity 15 then provides the allowed time regions to the distributed global master entity 11.

When a central and distributed global master entity pair operates in mode 2 (interference handling function A executed at the central global master entity 15, interference handling functions B and C executed at the distributed global master entity 11), the distributed global master entity 11 comprised in an AP informs the central global master entity 15 about which neighbor APs have been detected by its associated EPs. The distributed global master entity 11 does not need to provide information about which EPs have detected the neighbor AP, because it locally applies the first restriction rule of function B for these EPs, whereas for the neighbor APs the second restriction rule applies to all its EPs, so not to individual EPs. The central global master entity 15 then provides the pre-reservation of time-channels (or time slots) to the distributed global master entity 11 and information on each neighbor AP with a registered EP in the coverage area of the AP. Instead of the distributed global master entity 11 only informing the central global master entity 15 about which neighbor APs have been detected by its associated EPs, it may also include other distributed global master entities 11 of neighbor APs in providing that information, e.g., by applying broadcast or multicast communication. In that case, the central global master entity 15 does not need to provide the information about these neighbor APs when the distributed global master entity 11 of the neighbor entity has already provided it (the information should include the identification of the AP of course). This may safe communication overhead.

Figure 13:
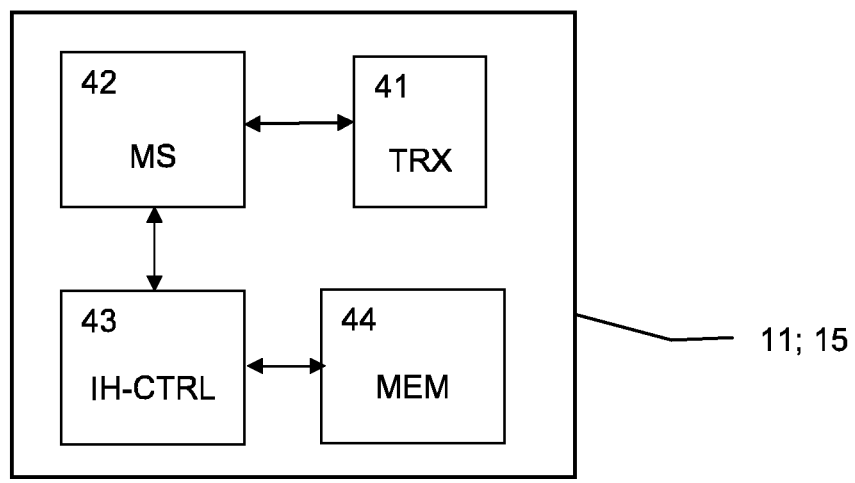
FIG. 13 shows schematically a block diagram of an interference handling control unit according to an embodiment.

When a central and distributed global master entity pair operates in mode 3 (no interference handling functionality at the central global master entity 15, all interference handling functions A, B, C executed at the distributed global master entity 11), each distributed global master entity 11 comprised in an AP informs the other distributed global master entities 11 about which neighbor APs have been detected by its associated EPs. The distributed global master entities 11 determine a pre-reservation of time-channels (or time slots) by running a distributed algorithm, e.g. by exchanging their pre-reserved time channel and then iteratively improve over time. In addition (by executing interference handling function B) each distributed global master entity 11 (comprised in a local AP) restricts the EPs (associated to this local AP) that have detected a neighbor AP, to its pre-reserved time-channel and restricts all its EPs (associated to this local AP) from each time channel for which the distributed global master entity 11 comprised in a neighbor AP has informed the entity of the local AP that an associated EP of the neighbor AP has detected to be in the coverage area of the local AP. Each distributed global master entity 11 then executes individual slot allocation as explained. FIG. 13 shows schematically a block diagram of an interference handling control unit according to an embodiment.

It is noted that only those blocks and/or functions are shown in FIG. 13, which are helpful to understand the present invention. Other blocks and/or functions have been omitted for brevity reasons.

The interference handling control unit may be provided at the central global master entity 15 and/or the distributed global master entity 11 (e.g. at the AP 12) of FIG. 1 and comprises an optical transceiver (TRX) 41 (i.e. a combined transmitter (optical emitters) and receiver (light sensors)) for optical communication (including IR and UV radiation) towards EPs, e.g., mobile user devices.

Furthermore, the interference handling control unit comprises a mode selector functionality (MS) 42 which can be controlled by a signaling of a negotiation process via the transceiver 41 e.g. to select one of the first to fourth operating modes (Mode 0 to 3) explained above. The mode selector functionality 42 supplies control information that indicates the selected operating mode to an interference handling controller (IH-CTRL) 43, e.g., a software-controlled processing unit, to activate and provide respective interference handling functions. The operation of the interference handling controller 43 makes use of a memory 44 in which program routines and parameters (e.g. visibility matrix and/or other look up tables) of the interference handling function A to C are stored.

In an example, the mode selector functionality 42 may be integrated in the interference handling controller 43 e.g. as an additional software routine.

Thus, the interference handling controller 43 activates or deactivates available interference handling functions based on the control information received from the mode selector functionality 42.

Figure 14:
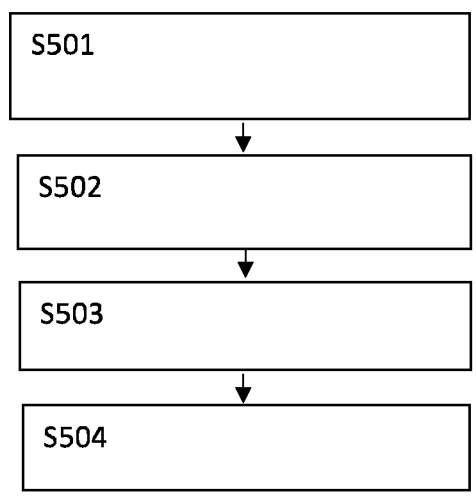
FIG. 14 shows a flow diagram of an interference handling control procedure according to an embodiment.

FIG. 14 shows a flow diagram of an interference handling control procedure according to an embodiment. The steps of FIG. 14 may be implemented by respective software routines used to control the interference handling controller 43 of FIG. 13 or any other controller provided at the central and/or distributed global master entity.

In a first step S501, a configuration negotiation is initiated with another interference handling entity with which the interference handling functions are intended to be shared. Then, in step S502, an operating mode (e.g. one of the first to fourth operating modes) is selected based on the result of negotiation. Thereafter, in step S503, available interference handling functions (e.g. functions A to C as described above) are activated or deactivated in response to the selected operating mode. Finally, in step S504, the interference handling operation is started based on the activated interference handling functions.

The proposed shared interference handling approach allows an adaptation of the total interference handling process to the capabilities and/or infrastructure of the optical wireless network. In case no central control is provided, all interference handling functions may be assigned to distributed global master entities (e.g. APs). Otherwise, if a central controller is provided and the APs are smart enough, rule evaluation and time-slot scheduling can be assigned to the APs to thereby reduce communication overhead at the central controller. On the other hand, more interference handling work can be assigned to the central controller if the less complex and more cost-efficient APs are desired.

In an embodiment, the number of levels of the interference handling functions A to C could be reduced by combining interference handling functions A and B into one level. This may improve the overall performance due to directly considering the EPs individually instead of first defining coarse time channels and restriction rules, which could be beneficial despite of an increased processing power need.

In a further embodiment, an additional level may be inserted between interference functions A and B to define a reserved period or reserved slots within each time-channel, e.g. for exclusive use of some types of communication by the AP (so never allowed by neighbor APs) to optimize system performance. In that case, the restriction rules used by the interference handling function B may need to be adapted (e.g. always exclude neighbor APs from the exclusively reserved periods or slots) and/or the rules may need to be applied on the reserved period or slots within the pre-reserved time channel. The size/number of the reserved period/slots may also be dynamically adapted to optimize performance, which could be an additional interference handling function before applying interference handling function B.

In a still further embodiment, the interference handling function B may be split into a first interference handling subfunction B1 representing the first restriction rule (restrict EP of AP to the pre-reserved time-channel) and a second interference handling subfunction B2 representing the second restriction rule (restrict all EP by excluding pre-reserved time-channel). The first interference handling subfunction B1 may then be better executed by the distributed global master entity 11 (the local AP already has the needed information) while the second interference handling subfunction B2 may be better executed by the central global master entity 15 for the neighbor AP (which does not have the needed info).

In a still further embodiment, the scheduling interference handling function C may be enhanced by checking for each slot whether it will actually be used by an interfering EP or not. The distributed global master entity 11 may provide information on its schedule to the central global master entity 15, which then informs the relevant distributed global master entities 11 of neighbor APs about free slot opportunities that would otherwise not be used by these neighbors.

To summarize, an interference handling method and system for an optical wireless communication system has been described, wherein multiple levels and operating modes are provided to flexibly handle partitioning of a coordination functionality between a central entity and distributed entities. Thereby, the coordination functionality which relies on interference reports from devices in overlapping coverage areas of access points can be central or distributed over access points or partly central and partly distributed.

While the invention has been illustrated and described in detail in the drawings and foregoing description, such illustration and description are to be considered illustrative or exemplary and not restrictive. The invention is not limited to the disclosed LiFi-based embodiments but may be applied to all kinds of optical wireless networks with interference handling functionality.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 12 and 14 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for coordinating interference handling in an optical wireless communication network, wherein the apparatus is configured to negotiate a configuration of interference handling functions, being a distribution of the interference handling functions between a central interference handling entity and a distributed interference handling entity and to set an interference handling operation mode based on the negotiated configuration and communicate said mode to the central interference handling entitle and the distributed interference handling entity, wherein the negotiation comprises an exchange of interference handling capabilities of the central interference handling entity and of the distributed interference handling entity with the apparatus; and establishing the configuration of interference handling functions based thereon;

wherein the interference handling operation mode determines a distribution of the interference handling functions between the central interference handling entity and the distributed interference handling entity, wherein the interference handling functions relate to different levels comprising: a first interference handling function of a highest level for assigning time slots or time channels to access points of the optical wireless communication network, a second interference handling function of a middle level for allocating allowed time regions to access points for each endpoint or group of endpoints, a third interference handling function of a lowest level for scheduling time slots to endpoints for each access point, where an interference handling function of a lower level is dependent on an outcome of an interference handling function of a higher level, and wherein interference handling functions assigned to the central interference handling entity have a higher level than interference handling functions assigned to the distributed interference handling entity.

2. The apparatus of claim 1, wherein one of the negotiable interference handling operation modes comprises one or more of:
- a first operating mode where the central interference handling entity executes the first and second interference handling functions and the distributed interference handling entity executes the third interference handling function,
- a second operating mode in which the central interference handling entity executes the first to third interference handling functions and the distributed interference handling entity executes no interference handling function,
- a third operating mode in which the central interference handling entity executes the first interference handling function and the distributed interference handling entity executes the second and third interference handling functions, and
- a fourth operating mode in which the central interference handling entity executes no interference handling function and the distributed interference handling entity executes the firsts to third interference handling functions.

3. The apparatus of claim 1, wherein the interference handling operating mode defines which of the interference handling functions is/are executed by the central interference handling entity and which of the interference handling functions is/are executed by the distributed interference handling entity.

4. An access point for providing access to an optical wireless communication system, the access point comprising a distributed interference handling entity and an apparatus as claimed in claim 1, wherein the apparatus is comprised in the access point or in the distributed interference handling entity.

5. A network controller for providing a global master function of an optical wireless communication system, the network controller comprising a central interference handling entity and an apparatus as claimed in claim 1, wherein the apparatus is comprised in the network controller or in the central interference handling entity.

6. The network controller of claim 5, wherein the apparatus is configured to delegate at least one of the interference handling functions to the distributed interference handling entity or to the central interference handling entity in response to the selected operating mode.

7. The network controller of claim 6, wherein the apparatus is configured to instruct the distributed interference handling entity which restriction rules the distributed interference handling entity should apply in the delegated at least one interference handling function.

8. The network controller of claim 5, wherein the delegated at least one of the interference handling functions comprises a function for allocating allowed time regions per endpoint or group of endpoints to an access point of the optical wireless communication network and a function for scheduling individual time slots per endpoint to an access point.

9. The network controller of claim 5, wherein the network controller is connected to a backbone network and configured to manage the optical wireless network.

10. An optical wireless communication system comprising a network controller as claimed in claim 5 and at least one access point.

11. The system of claim 10, wherein the central or distributed interference handling entity is configured to set a time window which determines how long an endpoint is assumed to stay in a coverage area of a neighbor access point after a receipt of a last presence reporting indicating the endpoint.

12. A method of coordinating interference handling in an optical wireless communication network, wherein the method comprises:
- negotiating a configuration of interference handling functions between a central interference handling entity and a distributed interference handling entity, the negotiating comprising exchanging of interference handling capabilities of the central interference handling entity and of the distributed interference handling entity with the apparatus; and establishing the configuration of interference handling functions based thereon; and
- setting an interference handling operation mode based on the negotiated configuration and communicating said mode to the central interference handling entity and the distributed interference handling entity;
- wherein the interference handling operation mode determines a distribution of the interference handling functions between the central interference handling entity and the distributed interference handling entity;
- wherein the interference handling functions relate to different levels comprising: a first interference handling function of a highest level for assigning time slots or time channels to access points of the optical wireless communication network, a second interference handling function of a middle level for allocating allowed time regions to access points for each endpoint or group of endpoints, a third interference handling function of a lowest level for scheduling time slots to endpoints for each access point, where an interference handling function of a lower level is dependent on an outcome of an interference handling function of a higher level, and wherein interference handling functions assigned to the central interference handling entity have a higher level than interference handling functions assigned to the distributed interference handling entity.

13. The method of claim 12, wherein one of the negotiable interference handling operation modes comprises one or more of:
- a first operating mode where the central interference handling entity executes the first and second interference handling functions and the distributed interference handling entity executes the third interference handling function,
- a second operating mode in which the central interference handling entity executes the first to third interference handling functions and the distributed interference handling entity executes no interference handling function,
- a third operating mode in which the central interference handling entity executes the first interference handling function and the distributed interference handling entity executes the second and third interference handling functions, and
- a fourth operating mode in which the central interference handling entity executes no interference handling function and the distributed interference handling entity executes the first to third interference handling functions.

* * * * *